(12) United States Patent
Friederichs et al.

(10) Patent No.: US 12,291,593 B2
(45) Date of Patent: May 6, 2025

(54) COMPOUNDS FOR USE IN CATALYST COMPOSITIONS FOR THE PRODUCTION OF POLYOLEFINS

(71) Applicant: SABIC GLOBAL TECHNOLOGIES B.V., Bergen op Zoom (NL)

(72) Inventors: Nicolaas Hendrika Friederichs, Brunssum (NL); Alexander Voskoboynikov, Moscow (RU); Dmitry Uborsky, Moscow (RU); Vincenzo Busico, Naples (IT); Roberta Cipullo, Naples (IT); Antonio Vittoria, Avella (IT); Mikhail Sharikov, Efremov (RU); Pavel Kulyabin, Khimki (RU); Daniil Nosov, Moscow (RU)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 539 days.

(21) Appl. No.: 17/761,347

(22) PCT Filed: Sep. 7, 2020

(86) PCT No.: PCT/EP2020/074937
§ 371 (c)(1),
(2) Date: Mar. 17, 2022

(87) PCT Pub. No.: WO2021/052797
PCT Pub. Date: Mar. 25, 2021

(65) Prior Publication Data
US 2022/0356275 A1 Nov. 10, 2022

(30) Foreign Application Priority Data
Sep. 20, 2019 (EP) .................................. 19198648

(51) Int. Cl.
| | | |
|---|---|---|
| *C07F 17/00* | (2006.01) | |
| *C07F 7/28* | (2006.01) | |
| *C08F 4/6592* | (2006.01) | |
| *C08F 110/02* | (2006.01) | |
| *C08F 110/06* | (2006.01) | |
| *C08F 210/16* | (2006.01) | |

(52) U.S. Cl.
CPC .............. *C08F 4/6592* (2013.01); *C07F 7/28* (2013.01); *C08F 210/16* (2013.01)

(58) Field of Classification Search
CPC ...... C07F 17/00; C08F 4/6592; C08F 210/16; C08F 110/02; C08F 110/06; C08F 210/06
See application file for complete search history.

(56) References Cited

U.S. PATENT DOCUMENTS

| | | |
|---|---|---|
| 6,248,912 B1 | 6/2001 | Lang et al. |
| 9,868,797 B2 | 1/2018 | Sankaran et al. |
| 2010/0267908 A1 | 10/2010 | Michiue et al. |
| 2016/0208025 A1 | 7/2016 | Sankaran et al. |

FOREIGN PATENT DOCUMENTS

| | | |
|---|---|---|
| EP | 1059299 A1 | 12/2000 |
| EP | 0668865 B1 | 7/2003 |
| EP | 2832739 A1 | 2/2015 |
| JP | 2003221411 A | 8/2003 |
| JP | 2018162231 A | 10/2018 |
| WO | 2008147952 A1 | 12/2008 |

(Continued)

OTHER PUBLICATIONS

Friederichs et al., "A combined experimental-molecular modeling apporach for ethene-propene copolymerization with C2-symmetric metallocense", Journal of Molecular Catalysis A: Chemical 242 (2005) p. 91-104.

(Continued)

*Primary Examiner* — Caixia Lu
(74) *Attorney, Agent, or Firm* — CANTOR COLBURN LLP

(57) ABSTRACT

The present invention relates to compounds according to formula I:

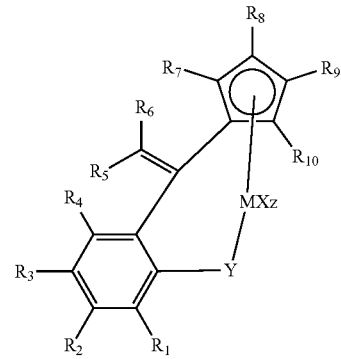

wherein: each R1-R10 may individually be H, a halogen, an alkoxy moiety, a siloxy moiety, a nitrogen-containing moiety, an alkyl moiety, an aryl moiety, or an aralkyl moiety, wherein each R1-R10 comprises ≤10 carbon atoms, wherein each of R1-R10 may form a cyclic moiety with an adjacent R1-R10 moiety; Y is O or N—R11, wherein R11 is an alkyl, cycloalkyl, aryl or aralkyl moiety comprising 1-12 carbon atoms; M is a group 3 or 4 transition metal; X is a sigma-bonded ligand, or a diene; z is the number of ligands X that are bonded to M. Such compounds may be used in a catalyst system for olefin polymerisation.

14 Claims, No Drawings

(56) References Cited

FOREIGN PATENT DOCUMENTS

WO    2014139949 A1    9/2014

OTHER PUBLICATIONS

International Search Report for International Application No. PCT/EP2020/074937, International Filing Date Sep. 7, 2020, Date of Mailing Nov. 19, 2020, 5 pages.
McDaniel et al in Macromolecules 2010 (43) p. 8836-8852.
Morton, J., et al. "1,1-0lefin-bridged bis-(2-indenyl) metallocenes of titanium and zirconium", Dalton Trans, 2014, 43, 13219-13231.
Randall et al. "A Review of High Resolution Liquid Carbon Nuclear Magnetic Resonance Characterizations of Ethylene-Based Polymers", Journal of Macromolecular Science—Reviews in Macromolecular Chem & Phys, C29 vol. 2 & 3, 1989, 16 pages.
Written Opinion for International Application No. PCT/EP2020/074937, International Filing Date Sep. 7, 2020, Date of Mailing Nov. 19, 2020, 8 pages.
Yano et al. "High-Temperature Ethylene/a-Olefin Copolymerization with a Zirconocene Catalyst: Effects of the Zirconocene Ligand and Polymerization Conditions on Copolymerization Behavior" Journal of Polymer Science: Part A: Polymer Chemistry, vol. 38, 4641-4648 (2000).

COMPOUNDS FOR USE IN CATALYST COMPOSITIONS FOR THE PRODUCTION OF POLYOLEFINS

CROSS REFERENCE TO RELATED APPLICATIONS

This application is a National Stage application of PCT/EP2020/074937, filed Sep. 7, 2020, which claims the benefit of European Application No. 19198648.8, filed Sep. 20, 2019, both of which are incorporated by reference in their entirety herein.

BACKGROUND

The present invention relates to compounds that are suitable for use as single-site type catalyst for the production of polyolefins, in particular for the production of ethylene-based polymers. The compounds display in a polymerisation of ethylene a high reactivity towards comonomers such as α-olefins, and allow for the production of ethylene-based copolymers having a high molecular weight.

Copolymers of ethylene and other olefins find widespread commercial application. For instance, medium-density polyethylene (MDPE), linear low-density polyethylene (LLDPE), polyolefin plastomers (POP), polyolefin elastomers (POE), and even ethylene-propylene-diene terpolymers (EPDM) are polymers that are typically produced using ethylene and other olefinic comonomers, using a transition metal-based catalyst. In commercial applications, the molecular weights of these polymers, expressed as the weight-averaged molecular weight ($M_w$) are typically above 10 kg/mol, more typically above 50 kg/mol, but also may be above 100 kg/mol, for such polymers to be of significant commercial importance.

In addition, the industrially important bimodal high-density polyethylene (HDPE) is used in certain high-demanding applications, for instance in pressure pipes. This bimodal HDPE comprises a low molecular weight homopolymer of ethylene, and a high molecular weight ethylene-based copolymer. The high molecular weight copolymer fraction in such bimodal HDPE typically has an $M_w$ of above 100 kg/mol, and for specific applications, the $M_w$ of the copolymer may even need to be above 300 kg/mol or even above 500 kg/mol.

Also, the ultra-high molecular weight polyethylene (UHMwPE), with $M_w$ of above 1000 kg/mol is often commercialised as a copolymer of ethylene and a small amount of comonomer, for example in applications that require very high impact resistance or low creep in fiber applications.

Hence, it is important to develop compounds that are suitable as catalysts to produce high molecular weight ethylene-based polymers.

In an industrial production process for the production of ethylene-based polymers, it is highly advantageous that the applied catalyst displays a high reactivity for the comonomer. It is well known in the art that the reactivity of α-olefins compared to ethylene decreases upon increase of the size of the α-olefin. In the context of the present invention, suitable α-olefins for use as comonomer in ethylene polymerisation reactions may for example be propylene, 1-butene, 1-hexene and 1-octene. For instance, the reactivity in copolymerisations with ethylene is understood to decrease from propylene>1-butene>1-hexene>1-octene, as published for example by Krentsel et al. in Polymers and Copolymers of Higher Alpha-Olefins, Carl Hanser Verlag, München, 1997, and by McDaniel et al. in Macromolecules, 2010(43), p. 8836-8852. As pointed out by Kissin in Transition Metal catalysed Polymerizations, Alkenes and Dienes, Quirck, R. P. (ed.), Harwood Academic Publishers, New York, 1983, part B, p. 597-615, this lower reactivity of the comonomer compared to ethylene is mainly due to steric crowding close to the reactive olefin bond. This may be understood to demonstrate why branched olefins, such as for instance 3-methyl-butene-1,4-methyl-pentene-1, vinyl cyclohexane or iso-butene are in general more difficult to incorporate compared to for instance propylene or 1-butene. If the reactivity of the comonomer is low, one needs to apply relatively high concentrations of the comonomer during the polymerisation process in order to incorporate significant, desirable amounts in the copolymer.

Such high concentrations are undesirable in industrial processes because the unreacted monomer needs to be separated from the polymer and subsequently recycled, which is an energy-intensive process, especially for comonomers with relatively high boiling points. In addition, in for example fluidised-bed gas-phase polymerisation processes, high amounts of liquid comonomers in the reactor can be detrimental to the fluidisation of the reactor contents. Therefore, especially when copolymerising ethylene with higher α-olefins or sterically encumbered olefins, catalysts are needed that display a high reactivity towards such comonomers.

Further, in the preparation of copolymers of ethylene and α-olefins, it is understood that the $M_w$ of the obtained copolymers tends to decrease upon increasing the α-olefin content of the copolymer, which for example has been published by Friederichs et al., J. Mol. Cat. A: Chemical, 242 (2005), p. 91-104. The combination of high comonomer incorporation and high molecular weight is therefore a challenging target for developing commercially available catalysts.

Numerous catalysts for copolymerisation of ethylene with other olefins are known. For example, it is widely accepted that conventional heterogeneous catalysts such as the so-called Ziegler- and Philips-type catalysts contain multiple different catalytically active species that translate into a heterogeneous mixture of polymers differing in molecular weight and comonomer content. When characterising the copolymers produced with such catalysts, this heterogeneity is observable from a broad polydispersity ($M_w/M_n$) as measured by techniques such as size exclusion chromatography (SEC) and a broad compositional distribution as measured by techniques such as for instance Temperature Rising Elusion Fractionation (TREF) or Crystallisation Elution Fractionation (CEF). Such broad polydispersity and broad composition distribution can translate into certain sub-optimal mechanical properties of the polymer. In contrast, discrete single-site catalysts, such as the well-known metallocene-type compounds, typically result in a single catalytically active specie that translates into a narrow polydispersity and narrow composition distribution, and eventually improved mechanical properties of the resulting copolymers.

In J. Polym. Sci. Part A: Polym. Chem., 2000 (38), p. 4641-4648, Yano et al. describe metallocene catalyst bearing a ligand containing a cyclopentadienyl and a substituted fluorenyl moiety for the production of high molecular weight ethylene/α-olefin copolymers. These catalysts as described by Yano et al. result in high molecular weight copolymers, even at high polymerisation temperatures, which illustrates that these catalysts can be considered as good catalyst for the preparation of copolymers with ethylene and α-olefins. However, it does not teach about the copolymerisation capability of these catalysts for preparing copolymers of ethylene with sterically encumbered comonomers such as 4-methyl-pentene-1 or vinyl cyclohexane.

EP668865 describes bis-2-indenyl metallocenes. EP1059299 describes bis-2-indenyl metallocenes, in which the bridging moiety contains at least one sp2-hybridised carbon bonded to the indenyl at the 2-position, including 2,2'-biphenylene bridged metallocenes such as for example 2,2'-bis(2-indenyl)biphenyl metallocenes. The described metallocenes in these documents do not provide the desired degree of comonomer incorporation and/or the desired high molecular weight of the obtained copolymer.

U.S. Pat. No. 6,248,912 describes half-metallocenes containing an amido moiety and a 2-indenyl ligand, bridged by a single carbon or an ethylene moiety. These catalysts display acceptable comonomer reactivity, but despite the low polymerisation temperature of 20° C., the intrinsic viscosities of the copolymers are rather low, indicative of a limited capability of these systems to produce high molecular weight copolymers.

US20100267908 describes bridged transition-metal compounds containing a 2-indenyl moiety and an ortho-phenoxy ligand. The molecular weights of the ethylene/α-olefin copolymers obtained with these catalysts are very low, typically below 5 kg/mol, which is prohibitively low for many commercial applications.

JP3885660 describes half-metallocenes in which a tetramethylcyclopentadienyl moiety is connected to an ortho-phenoxy ligand via a Si—Si, C—C, or Si—C bridge. The resulting catalysts display very modest activity for ethylene homopolymerisations and the polymers have a broad polydispersity, indicative of non-single site behaviour of the catalyst system. JP 3885660 does not disclose copolymerisation of ethylene with α-olefins or sterically encumbered olefins.

WO2015014832 describes half-metallocenes in which a cyclopentadienyl moiety is connected to an amido-group via a cyclic bridging group. The bridging group can be an o-phenylene group or a 2,2'-biphenylene group.

WO2015028595 describes metallocenes in which two cyclopentadienyl ligands are bridged via a 1,8-naphthalene moiety. WO2015014832 teaches that metallocenes containing a 1,8-naphthalene bridge result in ethylene-hexene copolymers with modest molecular weight.

In WO2014139949 and in Dalton Transactions, 2014, 43, p. 13219-13231, D. Stephan et al., metallocenes are described in which two 2-indenyl ligands are connected via a 1,1-disubstituted olefin, in which the 1,1-disubstituted olefin is further substituted with for example hydrogen, alkyl or phenyl groups or by a fluorenyl moiety.

Accordingly, despite all efforts there continues to be a need for development of a catalyst which is capable of producing polyolefins in high yield, with high reactivity towards comonomer incorporation, such as for example incorporation of α-olefins or sterically encumbered olefins in ethylene copolymerisation, and giving high molecular weight copolymers.

SUMMARY

This is now achieved according to the present invention by a compound according to formula I:

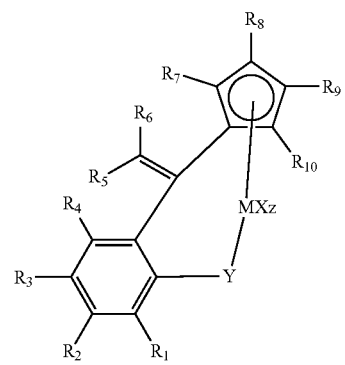

wherein:
each R1-R10 may individually be H, a halogen, an alkoxy moiety, a siloxy moiety, a nitrogen-containing moiety, an alkyl moiety, an aryl moiety, or an aralkyl moiety, wherein each R1-R10 comprises 10 carbon atoms, wherein each of R1-R10 may form a cyclic moiety with an adjacent R1-R10 moiety;
Y is O or N—R11, wherein R11 is an alkyl, cycloalkyl, aryl or aralkyl moiety comprising 1-12 carbon atoms;
M is a group 3 or 4 transition metal, preferably Ti, Zr or Hf, more preferably Ti;
X is
a sigma-bonded ligand, for example: (i) a halogen, (ii) an amine, or (iii) a moiety wherein each X may contain 1 to 10 carbon atoms, selected from an alkyl moiety, an aralkyl moiety, an alkoxy moiety, and an aryloxy moiety; or
a diene, for example a butadiene moiety or an isoprene moiety;
z is the number of ligands X that are bonded to M.

Such compounds may be used in a catalyst system for olefin polymerisation, particularly ethylene copolymerisation, providing at least one of a high catalyst activity, a high comonomer incorporation, and/or a high molecular weight polymer.

DETAILED DESCRIPTION

Each R5 and R6 may be the same or different. Preferably, both R5 and R6 are the same. Each R5 and R6 may be hydrogen or a moiety selected from methyl, ethyl, n-butyl, t-butyl, isobutyl or phenyl. Preferably, both R5 and R6 are the same and selected from hydrogen or a moiety selected from methyl, ethyl, n-butyl, or t-butyl. R5 and R6 may form a cyclic moiety. Examples of such cyclic moieties are cyclohexyl or fluorenyl. In a preferred embodiment, both R5 and R6 are CH$_3$-moieties.

In some embodiments of the invention, both R2 and R4 are hydrogen.

For example, R7 may form a cyclic moiety with R8. In certain embodiments, R7 and R8 together form an aromatic ring moiety that may be substituted or that may be unsubstituted. For example, R8 may form a cyclic moiety with R9. For example, R9 may form a cyclic moiety with R10. In certain embodiments, R9 and R10 together form an aromatic ring moiety that may be substituted or that may be unsubstituted. For example, where R7 and R8 form a cyclic moiety, it is preferred that R9 and R10 together form a cyclic moiety that is identical to that formed by R7 and R8.

For example, the moieties R7-R10 may be such that the moiety:

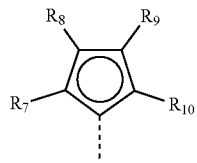

of formula I is a moiety selected from:

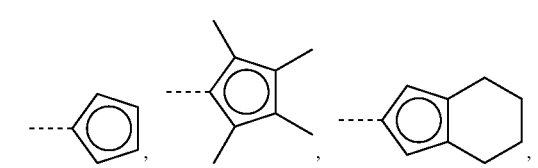

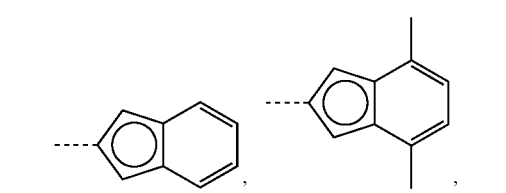

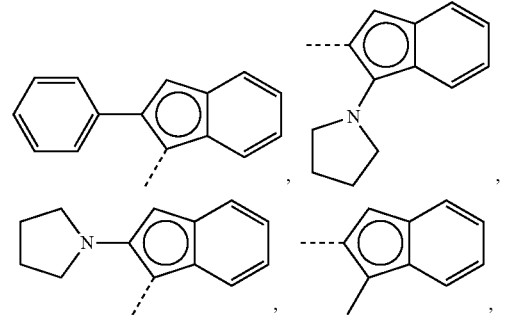

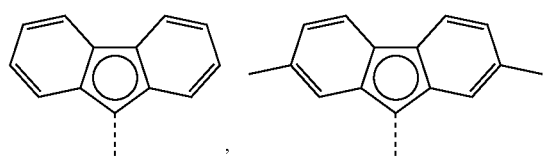

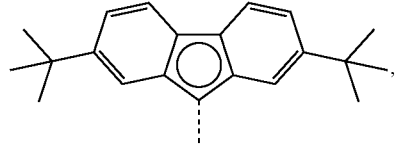

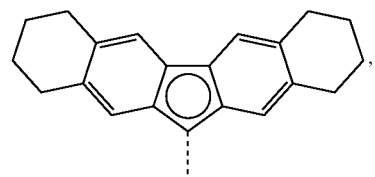

-continued

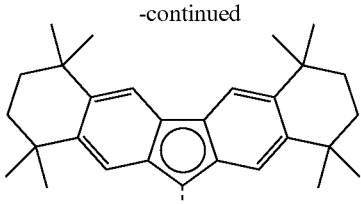

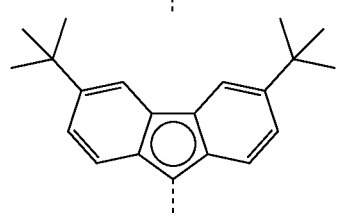

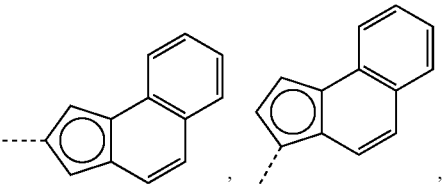

, and

For reasons of clarity, it needs to be understood that the dotted line in the above-presented figures indicates the position where the moiety is connected to the vinyl-based bridging moiety.

For example, each R1 and R3 may individually be a moiety selected from methyl, ethyl, isopropyl, n-butyl, isobutyl, t-butyl, adamantyl, phenyl, fluorine or methoxy. In certain embodiments, both R1 and R3 are the same. For example, both R1 and R3 may be a moiety selected from methyl, t-butyl, or phenyl. For example, both R2 and R4 may be hydrogen, and both R1 and R3 may be the same and may be a moiety selected from methyl, t-butyl, or phenyl.

For example, the moieties R1-R4 may be such that the moiety:

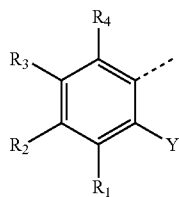

of formula I is a moiety selected from:

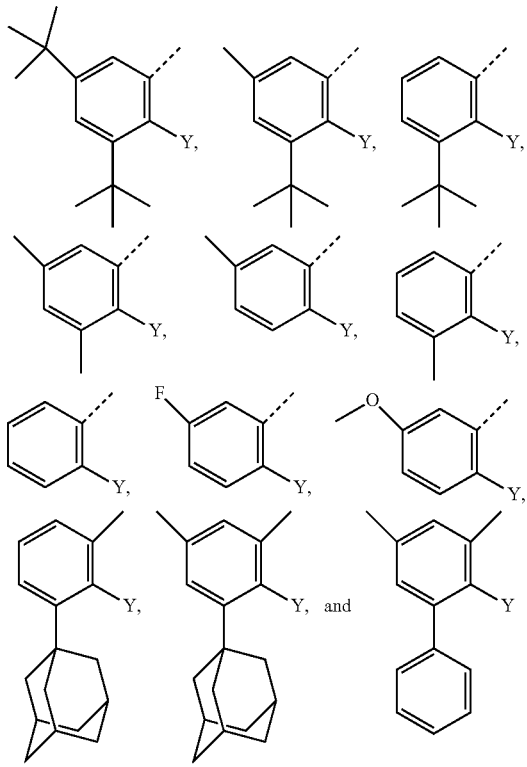

For reasons of clarity, it needs to be understood that the dotted line in the above-presented figures indicates the position where the moiety is connected to the vinyl-based bridging moiety.

Preferably, M is titanium. The moiety $MX_z$ may for example be selected from $ZrCl_2$, $TiCl_2$, $HfCl_2$, $Zr(CH_3)_2$, $Ti(CH_3)_2$, $Hf(CH_3)_2$, $Zr(benzyl)_2$, $Ti(benzyl)_2$, $Hf(benzyl)_2$, Ti(1,3-butadiene) or Ti(1,3-pentadiene). Preferably, $MX_z$ is $TiCl_2$ or $Ti(CH_3)_2$.

In a certain embodiment of the invention:
R2 and R4 are hydrogen;
R1 and R3 are the same and selected from methyl, ethyl, isopropyl, n-butyl, t-butyl or phenyl, preferably from methyl or t-butyl; and
R5 and R6 are the same and selected from methyl, ethyl, isopropyl, n-butyl, t-butyl or phenyl, preferably methyl.

In a further particular embodiment of the invention, R7 and R8 are fused to form a ring structure and R9 and R10 are fused to form a ring structure such that they form a substituted or unsubstituted fluorenyl moiety that is bound to the vinyl-based bridging moiety at the 9 position. For example, R7-R10 may be such to form an unsubstituted fluorenyl moiety, or a 2,7-di-t-butyl substituted fluorenyl moiety, wherein the fluorenyl moiety is bound to the vinyl-based bridging moiety at the 9 position.

The vinyl-based bridging moiety in the present context is to be understood to be the moiety

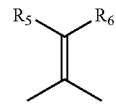

of formula I.

In a further embodiment of the invention, Y is oxygen or a nitrogen-containing group N—R11. R11 is preferably methyl, isopropyl, t-butyl, cyclohexyl, cyclododecyl or phenyl. Preferably, R11 is t-butyl or phenyl. In a further particular embodiment of the invention, Y is oxygen.

In catalyst systems for the polymerisation of olefins, the compounds of the invention can be used in combination with any activator that renders the system catalytically active in olefin polymerisation. Examples of such activators are for instance aluminoxanes such as methyl aluminoxanes (MAO), methyl-isobutyl aluminoxanes, and isobutyl aluminoxanes. Other suitable activators may for example be boron-based compounds, such as boron compounds containing (per)fluorinated aryl substituents, for example tris(pentafluorophenyl)borane and tetrakis(pentafluorophenyl)borate compounds. Examples of the latter are ammonium salts or trityl compounds of tetrakis(pentafluorophenyl)borate.

The catalysts based on the compounds of the present invention may be used in unsupported form, or may be used on a support material such as for instance polymeric supports, clay materials or inorganic oxides, such as for example silica or alumina. Alternatively, fluorided silica-alumina supports or sulfated alumina supports may be used. Methods for preparation of such supported polymerisation catalyst are well known in the art, and may be applied to the compounds of the present invention.

Preferably, the support is a silica having a surface area between 200 and 900 $m^2/g$ and/or a pore volume of >0.5 and <4.0 ml/g.

Alternatively, the support materials may be polymeric support materials, such as polyvinyl chloride, polystyrene, polyethylene or polypropylene.

The invention further also relates to a process for the preparation of olefin polymers by polymerisation of one or more olefins in the presence of a catalyst system comprising a compound of the present invention. In particular, wherein the catalyst system comprises a compound of the present invention and an activator, for example wherein the compound of the present invention is immobilised on a support.

In such process for the preparation of olefin polymers in the presence of a compound according to the invention, preferably a main group organometallic compound is present that can act as a scavenger compound to scrub impurities from the polymerisation system that might otherwise adversely affect the catalyst activity.

When X in formula I is a halogen, an alkoxide moiety or an amine moiety, an additional function of this main group organometallic compound is to substitute X with an organic group, for example to substitute X with an alkyl or aralkyl moiety such as a methyl, ethyl, propyl, isopropyl, butyl, isobutyl or benzyl moiety. This function of the main group organometallic compound is particularly advantageous when an activator other than an aluminoxanes is used. Suitable main group organometallic compounds are those able to exchange at least one or its organic moieties with X in the compounds of the invention.

For example, organolithium compounds, organomagnesium compounds, organoaluminium compounds, organozinc compounds, or mixtures thereof, may be used as such main group organometallic compound. Preferably, the main group organometallic compound is an organoaluminium compound. Suitable organoaluminium compounds are for example trimethylaluminium, triethylaluminium, triisopropylaluminium, tri-n-propylaluminium, triisobutylaluminium, tri-n-butylaluminium, tri-tert-butylaluminium, triamylaluminium, tri-n-hendaluminium, trioctylaluminium, isoprenylaluminium, dimethylaluminium ethoxide, diethylaluminium ethoxide, diisopropylaluminium ethoxide, di-n-propylaluminium ethoxide, diisobutylaluminium ethoxide, di-n-butylaluminium ethoxide, dimethylaluminium hydride, diethylaluminium hydride, diisopropylaluminium hydride, di-n-propylaluminium hydride, diisobutylaluminium hydride, and di-n-butylaluminium hydride. Mixture of these organoaluminium compounds are also suitable. Alternatively, aluminoxanes may be used as such main group organometallic compound. Examples of suitable aluminoxanes are methylaluminoxanes, methyl-isobutylaluminoxanes, isobutylaluminoxanes, and mixtures thereof.

In certain embodiments, it may be suitable to combine the main group organometallic compound with a compound containing at least one active hydrogen. Such combination may be done in-situ or ex-situ. In the present context, an active hydrogen means that the hydrogen atom is able to react with the main group organometallic compound. Suitable compounds comprising at least one active hydrogen in the context of the present invention are for example alcohol compounds, silanol compounds, and amine compounds. Suitable amine compounds are sterically encumbered amine compounds. Examples of sterically encumbered amine compounds are cyclohexyl amine or an alkylamine comprising at least one aliphatic group having at least four carbon atoms. Suitable alcohol compounds are preferably sterically encumbered alcohol compounds, such as substituted phenolic compounds. In principle, any substituted mono- or polyphenolic compound may be used. Suitable substituted monophenolic compounds are for example butylated hydroxytoluene (BHT, 2,6-di-t-butyl-4-methylphenol), 2,6-di-t-butylphenol, and α-tocopherol (vitamin E). Preferably, the amount of the compound comprising at least one active hydrogen is such that after combining this compound with the main group organometallic compound, the latter still contains organometallic bonds, preferably at least one organometallic bond per main group metal atom.

The process to produce the olefin polymers may start with the reaction of a compound of the invention and an activator, optionally in the presence of the main group organometallic compound, optionally in the presence of a compound comprising at least one active hydrogen atom, optionally in the presence of a suitable support material. This reaction may be performed in the same vessel as the reaction vessel wherein the olefin polymers are produced, or may be a separate vessel. It may be advantageous to combine the inventive compound at first with a portion of the quantity of the main group organometallic compound that is to be used, optionally in the presence of the compound containing at least one active hydrogen, before mixing with the activator. The resulting mixture may be fed to a polymerisation reactor. During the reactions as described here above, an inert solvent may be used.

The polymerisation reaction may be carried out in a slurry process, a solution process, or a gas-phase process.

The activator may be an aluminoxane-based activator. When a mixture of the inventive compound and such aluminoxanes-based activator is used, the activator may preferably be used in a quantity of between 10 and 100,000 moles of aluminium, preferably of between 10 and 10,000 moles of aluminium, per mole of the transition metal in the inventive compound.

Alternatively, the activator may be an organoboron-based activator. When a mixture of the inventive compound and such organoboron-based activator is used, the activator may preferably be used in a quantity of between 0.1 and 100 moles of boron, preferably of between 0.5 and 50 moles of boron, per mole of the transition metal in the inventive compound.

When the polymerisation is performed in a slurry or a solution process, the solvent that is used may be any organic solvent as is typically used in olefin polymerisation processes. For example, the solvent may be benzene, toluene, xylene, propane, butane, pentane, hexane, heptane, cyclohexane, methylcyclohexane, and methylchloride. Alternatively, the olefin that is to be polymerised may be used as solvent.

In the process to produce olefin polymers, the polymerisation conditions such as temperature, time, pressure, and monomer concentration may be chosen within wide limits. The polymerisation temperature may for example be in the range of between $-100°$ C. and $300°$ C., preferably between $0°$ C. and $240°$ C., more preferably between $50°$ C. and $200°$ C. The polymerisation time may for example be in the range from 10 seconds to 20 hours, preferably from 1 minute to 10 hours, more preferably from 3 minutes to 5 hours. In the polymerisation of ethylene, the ethylene pressure may for example be in the range of from 1 to 3500 bar, preferably from 1 to 2500 bar, more preferably from 1 to 1000 bar, even more preferably from 1 to 500 bar, yet even more preferably from 1 to 100 bar.

The molecular weight of the polymer may be controlled by well-known means such as the use of hydrogen or zinc-alkyls in the polymerisation. The polymerisation may be conducted in a batch process, a semi-continuous process, or a continuous process. The polymerisation may be conducted in two or more steps of different polymerisation conditions. The polymer that is produced may be separated from the solvent that is employed in the polymerisation reaction and from residual monomers and optionally comonomers, and dried by methods known to the person skilled in the art.

In a process for the production of olefin polymers using the compounds of the present invention, the polymerisation may involve a homopolymerisation of an olefin monomer, or a copolymerisation of an olefin monomer and one or more comonomer(s). The olefin monomer may for example be ethylene or propylene. The comonomer may for example be ethylene, propylene, 1-butene, 1-pentene, 3-methyl-1-butene, 3,3,-dimethyl-1-butene, 4-methyl-1-pentene, 3-methyl-1-pentene, 1-hexene, 1-octene, 1-nonene, 1-decene; a conjugated or a non-conjugated diene such as butadiene, 1,4-hexadiene, a substituted or unsubstituted norbornene, 5-ethylidene-2-norbornene, vinyl-norbornene, dicyclopentadiene, 4-methyl-1,4-hexadiene, 1,9-decadiene, or 7-methyl-1,6-octadiene; cyclic olefins such as cyclobutene, cyclopentene; or other olefinic compounds such as isobutene, vinyl-cyclohexane, or styrene.

Preferably, the olefin monomer is ethylene. The polymer produced using ethylene as olefin monomer may be referred to as an ethylene homopolymer, or, in case that the polymerisation is a copolymerisation reaction, an ethylene copolymer. Such ethylene homopolymers and copolymers may together be referred to as polyethylenes. In the case that for example three monomers are used, one can also produce terpolymers, for example if a combination of ethylene, propylene and a third comonomer containing at least two olefinic bonds, such as norbornadiene, dicylopentadiene, ethylidene-norbornene or vinyl-norbornene, are used, one can make terpolymers that can be referred to as EPDM. Preferably, the comonomer is an olefin having 3 or more carbon atoms, for example an olefin comprising 3 to 10 carbon atoms, such as an α-olefin comprising 3 to 10 carbon atoms.

Preferably, the comonomer is selected from propene, 1-butene, 1-hexene, 1-octene, norbornene, vinyl-cyclohexane, styrene, and 4-methyl-1-pentene. Preferably, the olefin monomer is ethylene, and the comonomer is selected from 1-butene, 1-hexene, 1-octene, norbornene, vinyl-cyclohexane, styrene, and 4-methyl-1-pentene.

Preferably, the process for the production of olefin polymers using the compounds of the present invention is copolymerisation of an olefin monomer and one or more comonomer(s), wherein the olefin monomer is ethylene, and the comonomer is selected from 1-butene, 1-hexene, 1-octene, norbornene, vinyl-cyclohexane, styrene, and 4-methyl-1-pentene. Particularly preferable, the process for the production of olefin polymers using the compounds of the present invention is copolymerisation of an olefin monomer and one or more comonomer(s), wherein the olefin monomer is ethylene, and the comonomer is selected from 1-butene, 1-hexene, 4-methyl-pentene-1, vinylcyclohexane, and 1-octene.

In case that the polymerisation is a copolymerisation of an olefin and one or more comonomer(s), the olefin and the comonomer(s) are different compounds.

The olefin polymer may for example comprise from 1.0 to 80.0 wt. % of moieties derived from the comonomer, preferably from 5.0 to 60.0 wt %, more preferably from 10.0 to 50.0 wt %, or from 10.0 to 30.0 wt %, with regard to the total weight of the olefin polymer. The ethylene copolymer may for example comprise from 1.0 to 80.0 wt. % of moieties derived from the comonomer, preferably from 5.0 to 60.0 wt %, more preferably from 10.0 to 50.0 wt %, or from 10.0 to 30.0 wt %, with regard to the total weight of the ethylene copolymer.

The polyethylene may for example have a melt mass-flow rate as determined in accordance with ASTM D1238-10 at 190° C. at a load of 2.16 kg ($MFI_{2.16}$) of ≥0.1 and ≤125 g/10 min. For example, the polyethylene may have an $MFI_{2.16}$ of ≥0.1 and ≤50 g/10 min, or ≥0.3 and ≤10.0 g/10 min, or ≥0.5 and ≤5.0 g/10 min.

The polyethylene may for example have a density of ≥855 kg/m³ and ≤965 kg/m³, as determined in accordance with ASTM D1505-10. The polyethylene may for example have a density of ≥855 and ≤910 kg/m³, or of ≥875 and ≤900 kg/m³. The polyethylene may for example have a density of ≥910 and ≤925 kg/m³, or of ≥910 and ≤920 kg/m³, or of ≥915 and ≤920 kg/m³. The polyethylene may for example have a density of ≥925 and ≤940 kg/m³, or of ≥930 and ≤940 kg/m³. The polyethylene may for example have a density of ≥940 and ≤965 kg/m³, or of ≥945 and ≤960 kg/m³.

It has been found that using the compounds of the present invention, it is possible to produce ethylene copolymers wherein the comonomer is selected from 1-butene, 1-hexene, and 1-octene with particularly high incorporation of the comonomer. The amount of incorporation of the comonomer may be expressed as the amount of short chain branches per 1000 carbon atoms in the polymer. The amount of short chain branches may for example be determined using $^{13}C$ NMR via the method as described by Randall, Rev. Macromol. Chem. Phys., C. 29, V. 2&3, p. 285-297. The ethylene copolymer may for example comprise at least 10, 25, or 80 short chain branches per 1000 carbon atoms in the polymer. The ethylene copolymer may comprise at most 200, 100, 50 or 25 short chain branches per 1000 carbon atoms in the polymer. The ethylene copolymer may for example comprise at least 10 and at most 200 short chain branches per 1000 carbon atoms in the polymer, or at least 15 and at most 100, or at least 20 and at most 50.

The polyethylene may have a number-average molecular weight ($M_n$) of between 1,000 and 1,000,000 g/mol, preferably between 10,000 and 500,000 g/mol, more preferably between 20,000 and 250,000 g/mol. The polyethylene may have a weight-average molecular weight ($M_w$) of between 2,000 and 5,000,000 g/mol, preferably between 5,000 and 1,000,000 g/mol, more preferably between 10,000 and 500,000 g/mol. The $M_w$ and $M_n$ are determined in accordance with ASTM D6474-12, using 1,2,4-trichlorobenzene or o-dichlorobenzene as solvent, and calibrated using polyethylene or polystyrene standards. The polyethylene may for example have a molecular weight distribution $M_w/M_n$ of ≥2.0 and ≤5.0, or ≥2.1 and ≤4.0, or ≥2.5 and ≤3.5.

The invention will now be illustrated by the following non-limiting examples.

Compounds

A number of compounds as listed in the table below were produced. The compounds C-1 through C-5 were provided as comparative materials, the compounds I-1 through I-8 demonstrate the present invention.

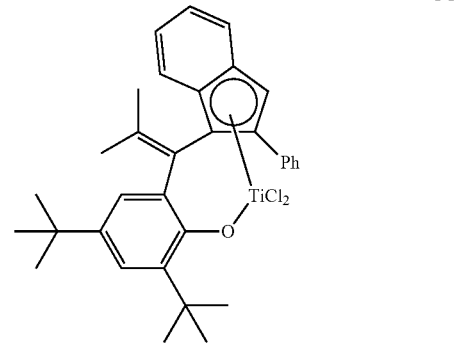

I-1

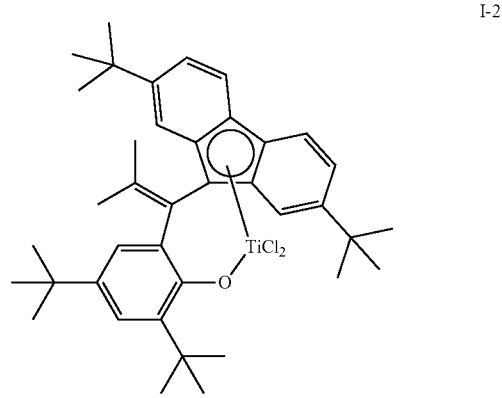

I-2

I-3
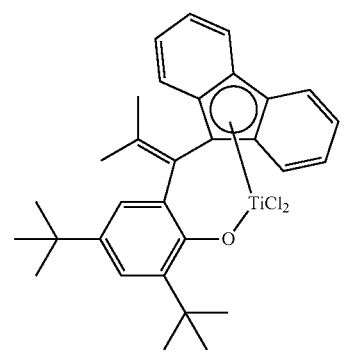
I-4
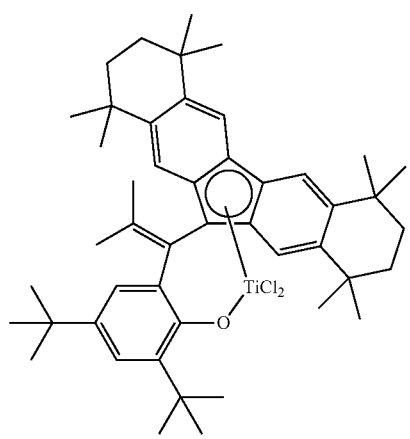
I-5
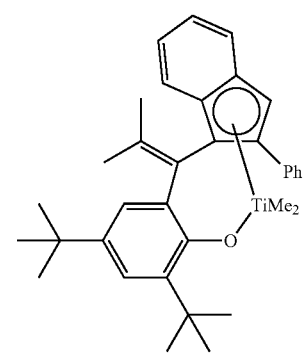
I-6
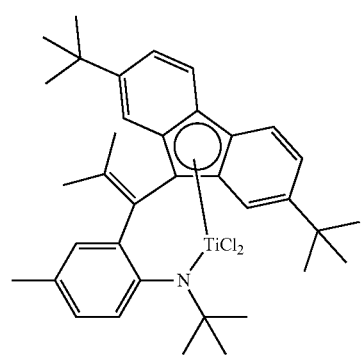
I-7
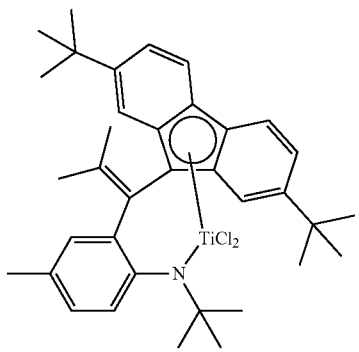
I-8
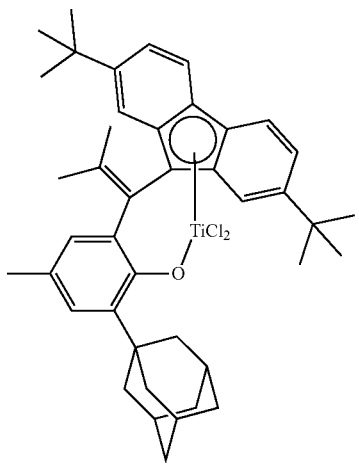
C-1
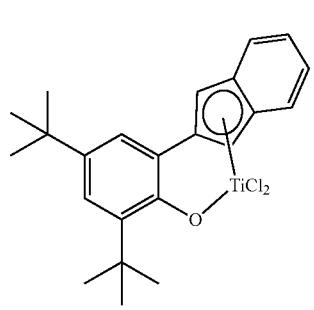
C-2
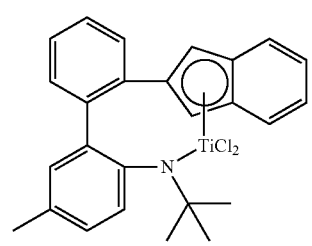

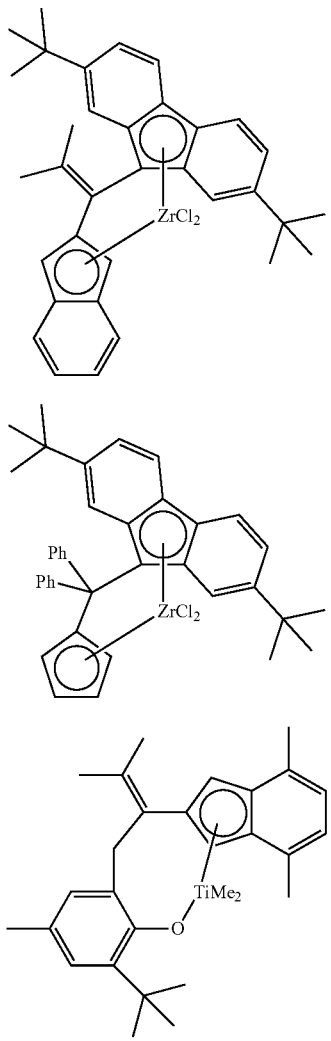

Wherein Ph stands for phenyl and Me stands for methyl.

Syntheses

General Considerations

All manipulations with air- and moisture-sensitive compounds were carried out under argon or nitrogen atmosphere using standard glove box, Schlenk, or high-vacuum line techniques. THF and diethyl ether were dried over sodium benzophenone ketyl and distilled before use. All organic chemicals were purchased and used as received from Aldrich. NMR spectra of substances and precatalysts were recorded on Bruker AV400 or Bruker Avance-II 600 spectrometer for 1-3% solutions in deuterated solvents. NMR solvents were purchased from Deutero GmbH. Chemical shifts were reported using the residual solvent signal. Ti(NMe$_2$)$_2$Cl$_2$ [C. Wang et. al., *Organometallics* 2005, 24(20), 4760], Zr(NMe$_2$)$_2$Cl$_2$thf$_2$ and Hf(NMe$_2$)$_2$Cl$_2$thf$_2$ [S. Brenner et. al., *Z. anorg. allg. Chem.* 1995, 621, 2021], 2,4-di-ted-butyl-1-(methoxymethoxy)benzene [T. Kurahashi et. al., *J. Am. Chem. Soc.* 2011, 133(21), 8307], 1-[2-(methoxymethoxy)-5-methylphenyl]adamantine [JP 2018162231 (A)], 2-bromo-3-methylbut-2-enal [T. R. Ramadhar et. al., *Synlett* 2017, 28(20), 2865], methyl 2-bromo-3-methylbut-2-enoate [H. Mori et. al., *J. Org. Chem.* 1998, 63(24), 8704], 2,2'-dibromo-4,4'-di-tert-butyl-biphenyl [J. Y. Corey et. al., *Organometallics* 2010, 29(21), 5708], 2,2'-dibromo-5,5'-di-tert-butylbiphenyl [H. A. Brune et. al., *J. Organomet. Chem.* 1991, 402(2), 171], 6,7-dibromo-1,2,3,4-tetrahydro-1,1,4,4-tetramethylnaphthalene [I. Rose et. al., *Nat. Mater.* 2017, 16(9), 932], 2-ted-butyl-4-fluorophenol [US Patent WO2008/147952A1], N-tert-butyl-4-methylaniline [J. R. Gage et. al., *J. Org. Chem.* 1995, 60(8), 2613], 2-bromo-N-phenylaniline [C. A. Wheaton et. al., *Organometallics* 2013, 32(21), 6148] were prepared according to the literature procedures.

2-tert-Butyl-4-fluoro-1-(methoxymethoxy)benzene. 2-tert-Butyl-4-fluorophenol (4.3 g, 26.0 mmol) was added in small portions to NaH (60% dispersion in mineral oil, 1.1 g, 26.8 mmol) in THF (100 ml) at 0° C. Further on, this mixture was warmed up to room temperature, then cooled to 0° C., and MOMCl (2.8 g, 36.4 mmol) was added dropwise. The reaction mixture was stirred overnight at room temperature then poured into cold water, and the organic layer was separated. The aqueous layer was extracted with ether (2×100 ml). The combined organic extract was dried over Na$_2$SO$_4$ and then evaporated to dryness. The product was isolated by flash-chromatography on silica gel 60 (40-63 um; eluent: hexane-dichloromethane=5:1, vol.) giving 4.8 g (87%) of a colorless oil.

3,3'-Dibromo-5,5,5',5',8,8,8',8'-octamethyl-5,5',6,6',7,7', 8,8'-octahydro-2,2'-binaphthalene. 34.6 ml nBuLi (86.7 mmol, 2.5 M in n-hexanes) was added dropwise to a solution of 60.0 g (173 mmol) of 6,7-dibromo-1,2,3,4-tetrahydro-1, 1,4,4-tetramethylnaphthalene in THF (500 mL) by vigorous stirring for 30 min at −78° C. Further on, this mixture was warmed to 0° C., and 10 ml of 3 M HCl was added. The organic solvents were removed by rotary evaporation, and the residue was extracted with diethyl ether. The combined extract was concentrated under reduced pressure, and the crude product was purified by recrystallization from a mixture of isopropanol and dichloromethane to give 37.05 g (80%) of pure product.

2-Bromo-N-(tert-butyl)-4-methylaniline. To a solution of 17.4 g (0.107 mmol) of N-(tert-butyl)-4-methylaniline in 100 ml of DMF a solution of 18.7 g (0.105 mol) of N-bromosuccinimide in 100 ml of DMF was added dropwise at 0° C. The reaction mixture was stirred overnight at room temperature and then poured into 500 ml of water. The obtained mixture was extracted with ether (3×100 ml). The combined organic extract was washed with water (3×200 ml), dried over Na$_2$SO$_4$, and then evaporated to dryness. The residue was distilled in vacuum to give 20.2 g (78%) of the tale product as a colorless oil, b.p. 100-105° C./1 mbar.

2-Bromo-trans-stilbene (L1). A mixture of benzyl chloride (7.0 g, 55.3 mmol) and triethyl phosphite (10.1 g, 60.8 mmol) was stirred under nitrogen for 17 h at 160° C. Further on, this mixture was cooled to room temperature and then diluted with 150 ml of THF. The resulting solution was cooled to 0° C., and 2.0 g of NaH (83.0 mmol) was added at 0° C. The obtained mixture was stirred for 30 min at 0° C., and then o-bromobenzaldehyde (11.3 g, 60.9 mmol) was added via a syringe at 0° C. The formed mixture was stirred for 18 h at room temperature, then diluted with diethyl ether (400 ml), washed with water (4×100 ml). The organic phase was separated, dried over Na$_2$SO$_4$, and evaporated to dryness. The residue was distilled in vacuum giving 10.0 g (70%) of L1, b.p.=125-135° C./1 mbar.

1-(1-Bromo-2-methylprop-1-en-1-yl)-2-phenyl-1H-indene (L2). To a solution of 2-bromo-trans-stilbene (5.0 g, 19.3 mmol) in 100 ml of THF nBuLi in hexanes (8.1 ml, 2.5 M, 20.3 mmol) was added dropwise at −78° C. This mixture was stirred for 40 min at −78° C., and then 2-bromo-3- methylbut-2-enal (4.1 g, 25.1 mmol) was added dropwise at −78° C. The resulting mixture was warmed to −30° C., and then saturated aqueous NH$_4$Cl (100 ml) was added. This mixture was extracted with diethyl ether (3×100 ml), the combined organic phase was collected, dried over Na$_2$SO$_4$, and then evaporated to dryness. To the residue toluene (1.2 L) and TsOH (4.0 g, 23.2 mmol) were added, and the resulting mixture was refluxed with Dean-Stark head for 3 h. Next, the formed hot solution was passed through the short pad of Celite, and the filtrate was evaporated to dryness. The residue was recrystallized from hexane giving a white solid (3.5 g, 56%).

3-[1-(3,5-Di-tert-butyl-2-(methoxymethoxy)phenyl)-2-methylprop-1-en-1-yl]-2-phenyl-1H-indene (L3). To a solution of 2,4-di-tert-butyl-1-(methoxymethoxy)benzene (6.9 g, 27.2 mmol) in 100 ml of diethyl ether nBuLi in hexanes (11.1 ml, 2.5 M, 27.7 mmol) was added at room temperature. This mixture was stirred overnight at room temperature, cooled to −78° C., and then a solution of 12 (3.0 g, 9.2 mmol) in 40 ml of THF was added. The resulting mixture was stirred overnight at room temperature and then poured into 200 ml of water. The organic layer was separated, and the aqueous layer was extracted with diethyl ether (3×50 ml). The combined organic extract was dried over Na$_2$SO$_4$ and then evaporated to dryness. The product was isolated via flash chromatography on silica gel 60 (40-63 um, eluent: hexane-dichloromethane=from 10:1 to 3:1, vol.) giving 3.5 g (77%) of a yellow solid.

2,4-Di-tert-butyl-6-[2-methyl-1-(2-phenyl-1H-inden-3-yl)prop-1-en-1-yl]phenol (L4). To a solution of L3 (3.5 g, 7.1 mmol) in a mixture of THF (100 ml) and methanol (200 ml) 0.3 ml of 12 M HCl was added, and this mixture was stirred overnight at 50° C. Further on, the obtained mixture was evaporated to dryness, and the product was isolated from the residue by flash chromatography on silica gel 60 (40-63 um, eluent: hexane-dichloromethane=10:1, vol.). Yield: 2.8 g (88%) of an orange oil.

General procedure A for synthesis of half-metallocene dichloride complexes. $^n$BuLi (2.5 M, 12.8 mmol) was added to a solution of proligand (6.4 mmol) in 60 mL of THF at −78° C. The obtained mixture was allowed to warm to room temperature and then stirred for 2 h. Further on, this solution was cooled to −78° C., and Ti(NMe$_2$)$_2$Cl$_2$ or M(NMe$_2$)$_2$Cl$_2$(THF)$_2$ (M=Zr or Hf) (6.4 mmol) was added in one portion at −78° C. The resulting mixture was warmed to room temperature, and then the solvent was evaporated. The residue was extracted with hot toluene, and insoluble materials were removed by filtration through Celite. Further on, dimethyldichlorosilane (0.86 ml, 7.05 mmol) was added to the filtrate at room temperature, the resulting mixture was stirred for 16 h at 50° C., then cooled to room temperature, and finally passed through a short pad of Celite. The filtrate was evaporated to dryness, the residue was triturated in hot hexane (50 ml), and the formed suspension was filtered through glass frit (G4). If needed the precipitate (the desired product) can be recrystallyzed from toluene-hexane.

General procedure B for synthesis of half-metallocene dimethyl complexes. A solution of MeMgBr in ether (2.9 M, 22 mmol) was added to a suspension of the respective half-metallocene dichloride complex (10 mmol) in ether (100 ml) at −30° C. The resulting mixture was stirred for 22 h at room temperature. Then, the solvent was evaporated in vacuum, the residue was extracted with hot toluene, and insoluble materials were removed by filtration through a short pad of Celite. The obtained filtrate was evaporated to dryness in vacuum, and the residue was recrystallized from toluene-hexane at −30° C. The precipitated solid was collected, washed with small amount of hexane, and then dried in vacuum.

Complex L5 (=I-1). General procedure A was applied to L4 to yield L5, which corresponds to inventive compound 1-1.

Complex L6 (=I-5). General procedure B was applied to L5 to yield L6, which corresponds to inventive compound 1-5.

General procedure C for syntheses of substituted 9-(1-bromo-2-methylprop-1-en-1-yl)-9H-fluoren-9-ols. To a solution of substituted 2,2'-dibromobiphenyl (110.6 mmol) in diethyl ether (800 ml) nBuLi in hexanes (90.3 ml, 2.5 M, 221.2 mmol) was added dropwise at 0° C. The formed slurry was stirred for 1 h at 0° C., and then anhydrous MgBr$_2$ (40.7 g, 221.2 mmol) was added in one portion. The resulting mixture was stirred for another 1 h at 0° C., and then methyl 2-bromo-3-methylbut-2-enoate (21.4 g, 110.6 mmol) was added. The obtained mixture was stirred overnight at room temperature, then saturated aqueous NH$_4$Cl (200 ml) was added. The organic layer was separated, and the aqueous layer was extracted with diethyl ether (2×200 ml). The combined organic extract was dried over Na$_2$SO$_4$ and then evaporated to dryness. The product was isolated by flash chromatography on silica gel 60 (40-63 um, eluent: hexane-dichloromethane=from 10:1 to 1:1, vol.).

Syntheses via general procedure C: 9-(1-Bromo-2-methylprop-1-en-1-yl)-9H-fluoren-9-ol (F5), 9-(1-Bromo-2-methylprop-1-en-1-yl)-2,7-di-tert-butyl-9H-fluoren-9-ol (F6), 9-(1-Bromo-2-methylprop-1-en-1-yl)-3,6-di-tert-butyl-9H-fluoren-9-ol (F7), and 12-(1-Bromo-2-methylprop-1-en-1-yl)-1,1,4,4,7,7,10,10-octamethyl-2,3,4,7,8,9,10,12-octahydro-1H-dibenzo[b,h]fluoren-12-ol (F8) were each synthesized via general procedure C.

General procedure D for syntheses of substituted 9-(1-bromo-2-methylprop-1-en-1-yl)-9H-fluorenes. To a solution of substituted 9-(1-bromo-2-methylprop-1-en-1-yl)-9H-fluoren-9-ol (86.5 mmol) in dichloromethane (1.5 L) triethylsilane (68.9 ml, 432.5 mmol) was added in one portion. Further on, trifluoroacetic acid (33.1 ml, 432.5 mmol) was added dropwise by vigorous stirring at −20° C. The resulting mixture was stirred overnight at room temperature, then water (1.5 L) was added, the organic layer was separated, and the aqueous layer was extracted with dichloromethane (2×200 ml). The combined organic extract was washed with aqueous NaHCO$_3$, then dried over Na$_2$SO$_4$, and evaporated to dryness. The residue was dissolved in hexane, the formed solution was passed through a short pad of silica gel 60 (40-63 um), and the elute was evaporated to dryness. The residue was dried in Kugelrohr apparatus (105° C., 0.5 mbar) for 4 h to get rid of siloxanes giving a white solid.

Syntheses via general procedure C: 9-(1-Bromo-2-methylprop-1-en-1-yl)-9H-fluorene (F9), 9-(1-Bromo-2-methylprop-1-en-1-yl)-2,7-di-tert-butyl-9H-fluorene (F10), 9-(1-Bromo-2-methylprop-1-en-1-yl)-3,6-di-tert-butyl-9H-fluorene (F11), and 12-(1-Bromo-2-methylprop-1-en-1-yl)-1,1,4,4,7,7,10,10-octamethyl-2,3,4,7,8,9,10,12-octahydro-1H-dibenzo[b,h]fluorine (F12) were each synthesized via general procedure D.

General procedure E for syntheses of substituted 9-(2-methylprop-1-en-1-ylidene)-9H-fluorenes. To solution of substituted 9-(1-bromo-2-methylprop-1-en-1-yl)-9H-fluorene (10.0 mmol) in 120 ml of THF lithium diisopropylamide mono(tetrahydrofuran) in cyclohexane (6.7 ml, 1.5 M, 10.1 mmol) was added at −78° C. This mixture was stirred for 2 h at room temperature, then poured into water (300 ml). The organic layer was separated, the aqueous layer was extracted with diethyl ether (3×50 ml). The combined organic extract was dried over $Na_2SO_4$ and then evaporated to dryness. The product was isolated by flash chromatography on silica gel 60 (40-63 um; eluent: hexane) giving a white solid.

Syntheses via general procedure E: 9-(2-Methylprop-1-en-1-ylidene)-9H-fluorene (F13), 2,7-Di-tert-butyl-9-(2-methylprop-1-en-1-ylidene)-9H-fluorene (F14), 3,6-Di-tert-butyl-9-(2-methylprop-1-en-1-ylidene)-9H-fluorene (F15), and 1,1,4,4,7,7,10,10-Octamethyl-12-(2-methylprop-1-en-1-ylidene)-2,3,4,7,8,9,10,12-octahydro-1H-dibenzo[b,h]fluorine (F16) were each synthesized via general procedure E.

General procedure F for syntheses of substituted (1-[2-(methoxymethoxy)phenyl]-2-methylprop-1-en-1-yl)-9,9a-dihydro-4aH-fluorenes. To a solution of ortho-substituted methoxymethoxybenzene (27.2 mmol) in diethyl ether (100 ml) nBuLi in hexanes (11.1 ml, 2.5 M, 27.7 mmol) was added at room temperature. This mixture was stirred overnight at room temperature, then cooled to −78° C., and a solution of substituted 9-(2-methylprop-1-en-1-ylidene)-9H-fluorene (9.2 mmol) in 40 ml of THF was added. The resulting mixture was stirred overnight at room temperature, then poured into water (200 ml). The organic layer was separated, and the aqueous layer was extracted with diethyl ether (3×50 ml). The combined organic extract was dried over $Na_2SO_4$ and then evaporated to dryness. The product was isolated by flash chromatography on silica gel 60 (40-63 um; eluent: hexane-dichloromethane=from 10:1 to 3:1, vol.) as a yellow oil.

Syntheses via general procedure F: 9-{1-[3,5-Di-tert-butyl-2-(methoxymethoxy)phenyl]-2-methylprop-1-en-1-yl}-9,9a-dihydro-4aH-fluorene (F17), 2,7-Di-tert-butyl-9-(1-[3,5-di-tert-butyl-2-(methoxmethoxy)phenyl]-2-methylprop-1-en-1-yl)-9,9a-dihydro-4aH-fluorene (F18), 2,7-Di-tert-butyl-9-{1-[3-tert-butyl-5-fluoro-2-(methoxymethoxy)phenyl]-2-methylprop-1-en-1-yl}-9,9a-dihydro-4aH-fluorene (F19), 2,7-Di-tert-butyl-9-{1-[3-(1-adamantyl)-2-(methoxmethoxy)-5-methylphenyl]-2-methylprop-1-en-1-yl}-9,9a-dihydro-4aH-fluorene (F20), 3,6-Di-tert-butyl-9-{1-[3,5-di-tert-butyl-2-(methoxmethoxy)phenyl]-2-methylprop-1-en-1-yl}-9,9a-dihydro-4aH-fluorene (F21), and 12-(1-[3,5-Di-tert-butyl-2-(methoxymethoxy)phenyl]-2-methylprop-1-en-1-yl)-1,1,4,4,7,7,10,10-octamethyl-2,3,4,7,8,9,10,12-octahydro-1H-dibenzo[b,h]fluorine (F22) were each synthesized via general procedure F.

General procedure G for syntheses of substituted 2-[1-(9,9a-dihydro-4aH-fluoren-9-yl)-2-methylprop-1-en-1-yl]phenols. To the obtained (1-[2-(methoxymethoxy)phenyl]-2-methylprop-1-en-1-yl)-9,9a-dihydro-4aH-fluorene (7.0 mmol) 50 ml of THF, 50 ml of methanol and 1 ml of 12 M HCl were subsequently added. The reaction mixture was stirred for three days (monitored by LC/MS) at 60° C. and then poured into 200 ml of water. The obtained mixture was extracted with dichloromethane (3×50 ml), the combined organic extract was dried over $Na_2SO_4$ and then evaporated to dryness. The product was isolated by flash chromatography on silica gel 60 (40-63 um; eluent: hexane-dichloromethane=10:1, vol.) giving a yellow oil.

Syntheses via general procedure G: 2,4-Di-tert-butyl-6-[1-(9,9a-dihydro-4aH-fluoren-9-yl)-2-methylprop-1-en-1-yl]phenol (F23), 2,4-Di-tert-butyl-6-[1-(2,7-di-tert-butyl-9,9a-dihydro-4aH-fluoren-9-yl)-2-methylprop-1-en-1-yl] phenol (F24), 2-Tert-butyl-4-fluoro-6-[1-(2,7-di-tert-butyl-9,9a-dihydro-4aH-fluoren-9-yl)-2-methylprop-1-en-1-yl] phenol (F25), 2-(1-Adamantyl)-4-methyl-6-[1-(2,7-di-tert-butyl-9,9a-dihydro-4aH-fluoren-9-yl)-2-methylprop-1-en-1-yl]phenol (F26), 2,4-Di-tert-butyl-6-[1-(3,6-d i-tert-butyl-9,9a-dihydro-4aH-fluoren-9-yl)-2-methylprop-1-en-1-yl] phenol (F27), and 2,4-Di-tert-butyl-6-[2-methyl-1-(1,1,4,4,7,7,10,10-octamethyl-2,3,4,7,8,9,10,12-octahydro-1H-dibenzo[b,h]fluoren-12-yl)prop-1-en-1-yl]phenol (F28) were each synthesized via general procedure G.

Syntheses via general procedure A: Complex F29, corresponding to inventive compound I-3, starting from F23; Complex F30, corresponding to inventive compound 1-2, starting from F24; Complex F31, starting from F24; Complex F32, starting from F24; Complex F33, starting from F25; Complex F34, corresponding to inventive compound 1-8, starting from F26; Complex F35, starting from F27; and Complex F36, corresponding to inventive compound 1-4, starting from F28, were each synthesized via general procedure A.

Syntheses via general procedure B: Complex F37, starting from F29; Complex F38, starting from FF30; Complex F39, starting from F31; Complex F40, starting from F32; and Complex F41, starting from F36, were each synthesized via general procedure A.

N-(tert-Butyl)-2-[1-(2,7-di-tert-butyl-9H-fluoren-9-yl)-2-methylprop-1-en-1-yl]-4-methylaniline (A1). To a solution of $(tBu)(2-Br-4-MeC_6H_3)NH$ (5.0 g, 20.6 mmol) and TMEDA (6.5 mL, 43.4 mmol) in ether (50 mL) 2.1 equiv of nBuLi (17.3 mL, 2.5 M in hexanes, 43.4 mmol) was added dropwise by vigorous stirring at −35° C. A light yellow precipitate formed immediately. The resulting mixture was allowed to warm up to room temperature, and the precipitate was filtered off (G3), then dried in vacuum giving 2.2 g of a white solid (supposedly $(tBu)[(TMEDA)Li(2-[4-MeC_6H_3]-1)]NLi(TMEDA)$, 5.4 mmol). To a solution of 2,7-di-tert-butyl-9-(2-methylprop-1-en-1-ylidene)-9H-fluorene (F14) (1.8 g, 5.4 mmol) in THF (30 ml) the above-described precipitate (2.2 g, 5.4 mmol) was added in one portion at −30° C. The obtained mixture was stirred overnight at room temperature forming red-orange solution. This solution was poured into water (100 ml), the crude product was extracted with diethyl ether (3×50 ml). The combined organic extract was dried over $Na_2SO_4$ and then evaporated to dryness. The product was isolated from the residue by flash chromatography on silica gel 60 (40-63 um; eluent: hexane-dichloromethane=10:1, vol.) giving 2.5 g (79% relative to allene) of a yellow glassy material.

N-Phenyl-2-[1-(2,7-di-tert-butyl-9H-fluoren-9-yl)-2-methylprop-1-en-1-yl]-aniline (A2). To a solution of $(Ph)(2-BrC_6H_4)NH$ (5.8 g, 23.2 mmol) and TMEDA (7.3 mL, 48.7 mmol) in ether (60 mL) 2.1 equiv of nBuLi (19.5 mL, 2.5 M in hexanes, 48.7 mmol) was added dropwise by vigorous stirring at −35° C. A light yellow precipitate formed immediately. This mixture was allowed to warm up to room temperature, and the precipitate was filtered off (G3) and then dried in vacuum giving 1.3 g of a white solid (supposedly $(Ph)[(TMEDA)Li(1-C_6H_4-2)]NLi(TMEDA)$, 3.14 mmol). To a solution of 2,7-di-tert-butyl-9-(2-methylprop-1-en-1-ylidene)-9H-fluorene (F14) (0.7 g, 2.1 mmol) in THF (20 ml) the above-described precipitate was added in one portion at −30° C. The formed mixture was stirred overnight at room temperature giving a red-orange solution which was then poured into water (100 ml). The crude product was extracted with diethyl ether (3×50 ml). The combined organic extract was dried over $Na_2SO_4$ and then evaporated to dryness. The product was isolated by flash chromatography on silica gel 60 (40-63 um, eluent: hexane-dichloromethane=10:1, vol.) giving 0.93 g (89% relative to allene) of a yellow glassy material.

Syntheses via general procedure A: Complex A3, corresponding to inventive compound 1-6, starting from A1; Complex A4, starting from A2; and Complex A5, corresponding to inventive compound 1-7 were each synthesized via general procedure A.

Compound C-4 was manufactured according to the procedure of Yano et al.

Polymerisation

Using the above listed inventive and comparative compounds as catalysts, a number of polymerisation experiments were conducted, of which the results are listed below.

The polymerizations were carried out in a Parallel Pressure Reactor (PPR48) for olefin polymerization. This equipment, containing 48 reactors mounted in a triple glove-box, was sold commercially by the company Symyx, thereafter by the company Freeslate. The applied polymerization protocols were as follows:

Prior to the execution of a library, the 48 PPR cells (reactors) undergo 'bake-and-purge' cycles overnight (8 h at 90-140° C. with intermittent dry N2 flow), to remove any contaminants and left-overs from previous experiments. After cooling to glove-box temperature, the stir tops are taken off, and the cells are fitted with disposable 10 mL glass inserts and PEEK stirring paddles (previously hot-dried under vacuum); the stir tops are then set back in place, the cells are loaded with the proper amounts of toluene (in the range 2.0-4.0 mL), comonomer (in the range 0.05-2.0 mL) and a tri-iso-butyl-aluminium (TiBAl)/butylated-hydroxy-toluene (BHT) (1:1 reaction product) solution, thermostated at 80° C., and brought to the operating pressure of 65 psig with ethylene. The TiBAl/BHT amount was chosen such that [Al]=3 mM.

The activator was trityl-tetrakis-pentafluorophenylborate (TTB) using a [B]/[Ti] molar ratio of 10. The catalyst injection sequence is as follows: proper volumes of a toluene 'chaser', a solution of the precatalyst in toluene (typically in the range 0.005-0.05 mmol L−1), and a toluene 'buffer' are uptaken into the slurry needle, and then injected into the cell of destination. The reaction is left to proceed under stirring (800 rpm) at constant temperature and pressure with continuous feed of ethylene for 5-60 min, and quenched by over-pressurizing the cell with dry air (preferred to other possible catalyst poisons because in case of cell or quench line leaks oxygen is promptly detected by the dedicated glove-box sensor).

After quenching, the cells are cooled down and vented, the stir-tops are removed, and the glass inserts containing the reaction phase are taken out and transferred to a Genevac EZ2-Plus centrifugal evaporator, where all volatiles are distilled out and the polymers are thoroughly dried overnight. Reaction yields are double-checked against on-line monomer conversion measurements by robotically weighing the dry polymers in a Bohdan Balance Automator while still in the reaction vials (subtracting the pre-recorded tare). Polymer aliquots are then sampled out for the characterizations.

GPC curves are recorded with a Freeslate Rapid GPC setup, equipped with a set of 2 mixed-bed Agilent PLgel 10 μm columns and a Polymer Char IR4 detector. The upper deck of the setup features a sample dissolution station for up to 48 samples in 10 mL magnetically stirred glass vials, 4 thermostated bays each accommodating 48 polymer solutions in 10 mL glass vials, and a dual arm robot with two heated injection needles. With robotic operation, pre-weighed polymer amounts (typically 1-4 mg) are dissolved in proper volumes of orthodichlorobenzene (ODCB) containing 0.40 mg mL−1 of 4-methyl-2,6-di-tert-butylphenol (BHT) as a stabilizer, so as to obtain solutions at a concentration of 0.5 to 1.0 mg mL−1. After 2-4 h at 150° C. under gentle stirring to ensure complete dissolution, the samples are transferred to a thermostated bay at 145° C., and sequentially injected into the system at 145° C. and a flow rate of 1.0 mL min-1. In post-trigger delay operation mode, the analysis time is 12.5 min per sample. Calibration is carried out with the universal method, using 10 monodisperse polystyrene samples (Mn between 1.3 and 3700 KDa). Before and after each campaign, samples from a known i-PP batch produced with an ansa-zirconocene catalyst are analyzed for a consistency check. The weight average molecular weight ($M_w$) is expressed in kg/mol.

$^{13}C$ NMR spectra are recorded with a Bruker Avance 400 III spectrometer equipped with a 5 mm High Temperature Cryoprobe, and a robotic sample changer with pre-heated carousel (24 positions). The samples (20-30 mg) are dissolved at 120° C. in tetrachloroethane-1,2-d2 (0.6 mL), added with 0.40 mg mL−1 of BHT as a stabilizer, and loaded in the carousel maintained at the same temperature. The spectra are taken sequentially with automated tuning, matching and shimming. Typical operating conditions for routine measurements are: 45° pulse; acquisition time, 2.7 s; relaxation delay, 5.0 s; 400-800 transients (corresponding to an analysis time of 30-60 min). Broad-band proton decoupling is achieved with a modified WALTZ16 sequence (BI_WALTZ16_32 by Bruker).

Unless specified otherwise, the catalyst activity is indicated by Rp, the calculated polymerisation rate, expressed as kilograms of copolymer, produced per mmol of catalyst per mol of ethylene in the reactor-diluent per hour.

The weight average molecular weight $M_w$ and the number average molecular weight $M_n$ were determined in accordance with ASTM D6474 (2012), and expressed in kg/mol. The molecular weight distribution MWD is calculated as $M_w/M_n$.

Experiments 1-23 were conducted as copolymerisation experiments using 1-hexene (C6) as comonomer, or homopolymerisation experiments, i.e. in those experiments where the vol % of C6 is 0.

| Exp. | Cat. | C6 (vol %) | Activity - Rp | $M_n$ (kg/mol) | $M_w$ (kg/mol) | PDI ($M_w/M_n$) | C6 inc (mol %) |
|---|---|---|---|---|---|---|---|
| 1 | I-1 | 1 | 7540 | 84 | 200 | 2.4 | 5.0 |
| 2 |  | 2 | 3360 | 65 | 126 | 1.9 | 8.4 |
| 3 | I-2 | 1 | 1180 | 130 | 430 | 3.3 | 7.2 |
| 4 |  | 2 | 1490 | 96 | 330 | 3.4 | 14.0 |
| 5 | I-3 | 1 | 880 | 143 | 432 | 3.0 | 5.0 |
| 6 |  | 2 | 2250 | 82 | 202 | 2.5 | 10.4 |
| 7 | I-4 | 1 | 360 | 192 | 689 | 3.6 | 6.9 |
| 8 |  | 2 | 860 | 152 | 443 | 2.9 | 7.9 |
| 9 | I-5 | 1 | 4560 | 93 | 201 | 2.2 | 4.4 |
| 10 |  | 2 | 3600 | 53 | 115 | 2.2 | 8.2 |

-continued

| Exp. | Cat. | C6 (vol %) | Activity - Rp | $M_n$ (kg/mol) | $M_w$ (kg/mol) | PDI ($M_w/M_n$) | C6 inc (mol %) |
|---|---|---|---|---|---|---|---|
| 11 | I-6 | 2 | 3 | 186 | 1288 | 6.9 | 4.5 |
| 12 | I-7 | 2 | 1 | 165 | 462 | 2.8 | 7.5 |
| 13 | I-8 | 2 | 530 | 112 | 368 | 3.3 | 8.0 |
| 14 | C-1 | 0 | 120 | — | — | — | — |
| 15 |  | 10 | 74 | — | 0.7 | — | — |
| 16 | C-2 | 5 | 130 | 227 | 683 | 3.0 | 3.8 |
| 17 |  | 10 | 140 | 218 | 631 | 2.9 | 6.4 |
| 18 | C-3 | 2 | 1260 | 16 | 36 | 2.3 | 5.3 |
| 19 | C-4 | 1 | 620 | 188 | 470 | 2.5 | 1.3 |
| 20 |  | 5 | 580 | 144 | 345 | 2.4 | 6.6 |
| 21 | C-5 | 0 | 590 | — | — | — | — |
| 22 |  | 1 | 950 | 9 | 17 | 1.9 | 6.1 |
| 23 |  | 2 | 4130 | 4.1 | 10 | 2.5 | 11.0 |

Comparative compounds C-1, C-3 and C-5 result in low molecular weight copolymers. Comparative compound C-2 results in relatively low activities and modest comonomer incorporation. The latter is indicated by experiment 17, which shows that in order to obtain >5 mol % 1-hexene incorporation, 10 vol % 1-hexene loading is required, which is 5 to 10 times higher loading of 1-hexene compared to the inventive compounds. Comparative compound C-4 results in relatively low comonomer incorporation, as indicated by the fact that for instance at 1 vol % 1-hexene loading, only 1.3 mol % 1-hexene is incorporated, being significantly lower compared to the experiments with the inventive compounds at 1 vol % 1-hexene loading.

From these results, it is apparent that the inventive compounds result in catalysts that display an excellent comonomer incorporation, as is illustrated by the higher hexene incorporation in comparison to the comparative catalysts. In addition, the inventive catalysts display high catalyst activity combined with high molecular weight copolymers.

In experiments 24 and 25, the inventive compound 1-1 was tested in copolymerizations of ethylene with 4-methyl-pentene-1 (4MP1) and vinyl-cyclohexane (VCH).

| Exp. | Comonomer | Loading of comonomer (vol %) | Activity - Rp | $M_n$ (kg/mol) | $M_w$ (kg/mol) | PDI ($M_w/M_n$) | Comonomer incorporation (mol %) |
|---|---|---|---|---|---|---|---|
| 24 | 4MP1 | 2.0 | 6560 | 45 | 95 | 2.1 | 4.5 |
| 25 | VCH | 5.0 | 3220 | 13 | 25 | 1.9 | 5.8 |

These results illustrate that the inventive compounds result in catalysts that display excellent incorporation of sterically hindered olefins.

The invention claimed is:

1. Compound according to formula I:

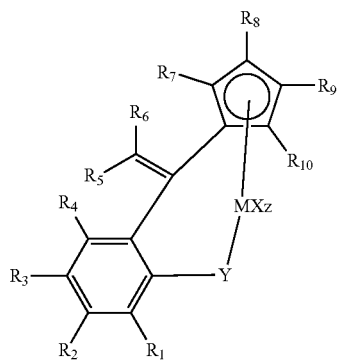

wherein:
each $R_1$-$R_{10}$ is individually H, a halogen, an alkoxy moiety, a siloxy moiety, a nitrogen-containing moiety, an alkyl moiety, an aryl moiety, or an aralkyl moiety, wherein each $R_1$-$R_{10}$ comprises ≤10 carbon atoms, wherein each of $R_1$-$R_{10}$ may form a cyclic moiety with an adjacent $R_1$-$R_{10}$ moiety;
Y is O or N—$R_{11}$, wherein $R_{11}$ is an alkyl, cycloalkyl, aryl or aralkyl moiety comprising 1-12 carbon atoms;
M is a group 3 or 4 transition metal;
X is
  a sigma-bonded ligand, or
  a diene;
z is the number of ligands X that are bonded to M.

2. Compound according to claim 1, wherein $R_5$ and $R_6$ are the same or are different, and:
are hydrogen or a moiety selected from methyl, ethyl, n-butyl, t-butyl, isobutyl or phenyl, or
together form a cyclic moiety.

3. Compound according to claim 1, wherein each $R_1$ and $R_3$ individually are a moiety selected from methyl, ethyl, isopropyl, n-butyl, t-butyl, isobutyl, adamantyl, or phenyl.

4. Compound according to claim 1, wherein $R_7$ forms a cyclic moiety with $R_8$, and/or $R_8$ forms a cyclic moiety with $R_9$, and/or $R_9$ forms a cyclic moiety with $R_{10}$.

5. Compound according to claim 1, wherein the moieties $R_1$-$R_4$ are such that the moiety:

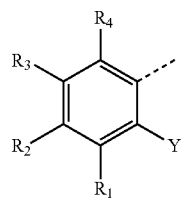

of formula I is a moiety selected from:

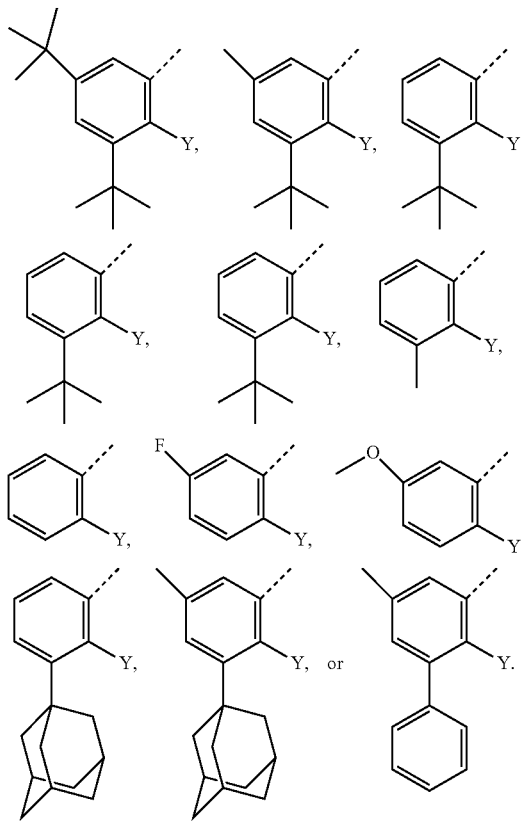

6. Compound according to claim 1, wherein the moieties $R_7$-$R_{10}$ are such that the moiety:

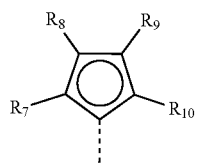

of formula I is a moiety selected from:

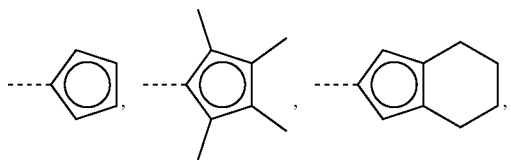

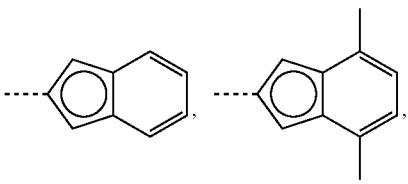

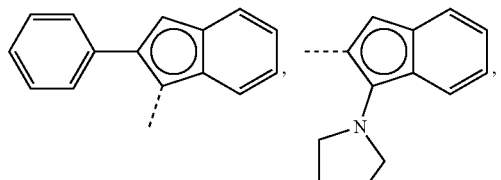

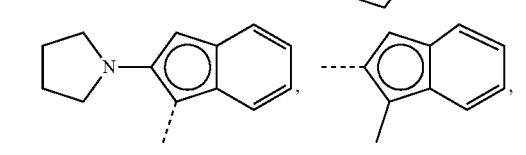

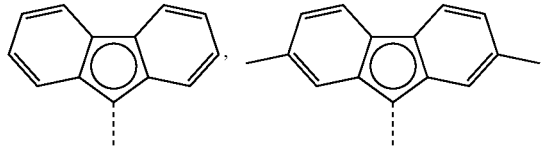

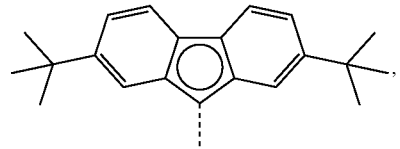

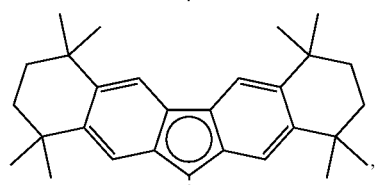

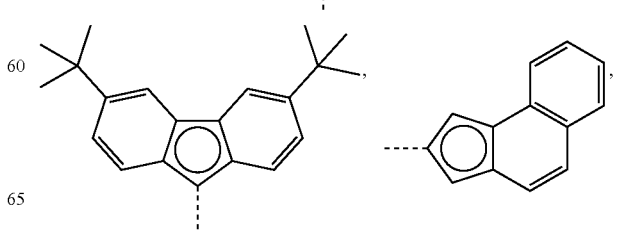

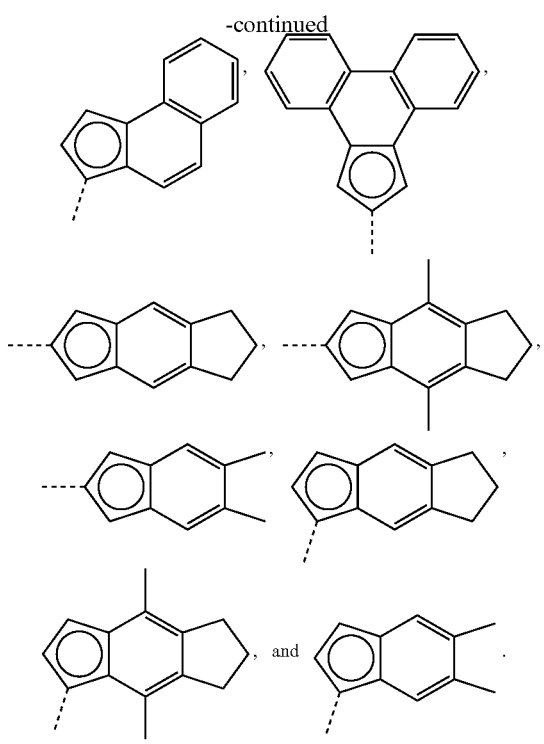

7. Compound according to claim 1, wherein MXz is selected from ZrCl$_2$, TiCl$_2$, HfCl$_2$, Zr(CH$_3$)$_2$, Ti(CH$_3$)$_2$, Hf(CH$_3$)$_2$, Zr(benzyl)$_2$, Ti(benzyl)$_2$, Hf(benzyl)$_2$, Ti(1,3-butadiene) or Ti(1,3-pentadiene).

8. Compound according to claim 1, wherein Y is O or N—R$_{11}$, wherein R$_{11}$ is selected from methyl, ethyl, n-propyl, i-propyl, t-butyl, cyclohexyl, cyclododecyl, or a substituted or unsubstituted phenyl.

9. Compound according to claim 1, wherein the compound is supported onto a polymeric support, a clay material, or an inorganic oxide.

10. Catalyst composition comprising the compound according to claim 1 and an activator.

11. Catalyst composition comprising the compound according to claim 1, wherein the catalyst composition further comprises a main group organometallic compound.

12. Catalyst composition comprising the compound according to claim 1, wherein the catalyst composition further comprises a compound containing at least one active hydrogen.

13. Process for the polymerisation of olefins, the process comprising polymerizing ethylene or propylene, or copolymerizing ethylene or propylene with one or more comonomer(s) in the presence of the catalyst composition according to claim 10.

14. Process according to claim 13, wherein the process is a copolymerisation process of ethylene with one or more comonomer(s), wherein the comonomer(s) are selected from propene, 1-butene, 1-hexene, 1-octene, norbornene, ethylidene-norbornene, vinyl-norbornene, vinyl-cyclohexane, styrene, or 4-methyl-1-pentene.

* * * * *